(12) United States Patent
Rudoy et al.

(10) Patent No.: US 6,525,920 B2
(45) Date of Patent: Feb. 25, 2003

(54) ELECTRICALLY AND MECHANICALLY REDUNDANT RELEASE MECHANISM

(75) Inventors: Edward Rudoy, Woodland Hills, CA (US); Larry Leroy McCormick, Chatsworth, CA (US); Edwin E. Vega, Woodland Hills, CA (US); Craig W. Courtney, West Hills, CA (US)

(73) Assignee: Nea Electronics, Inc., Chatsworth, CA (US)

( * ) Notice: Subject to any disclaimer, the term of this patent is extended or adjusted under 35 U.S.C. 154(b) by 0 days.

(21) Appl. No.: 09/835,090

(22) Filed: Apr. 13, 2001

(65) Prior Publication Data

US 2002/0080547 A1 Jun. 27, 2002

Related U.S. Application Data

(60) Provisional application No. 60/197,014, filed on Apr. 13, 2000.

(51) Int. Cl.⁷ .................................................. H01H 9/00
(52) U.S. Cl. ...................................................... 361/160
(58) Field of Search ................................ 361/160, 166, 361/167, 191

(56) References Cited

U.S. PATENT DOCUMENTS 3,818,994 A * 6/1974 Livingston

* cited by examiner

Primary Examiner—Edward H. Tso
(74) Attorney, Agent, or Firm—Lewis B. Sternfels

(57) ABSTRACT

Two fuse wires (42a, 42b) hold an insulator hub (34) in place which, in turn, retains a hook-shaped release end (32) of a restraining wire (28). The insulator hub is provided with two grooves (36a, 36b), one for fuse wire (42a) and one for fuse wire (42b), and with a center hole (38) midway between the grooves. A lanyard (35) is terminated at its ends by a pair of loops (35a, 35b). Loop (35b) is secured through center hole (38) in the insulator hub. The fuse wires are connected to two power supplies (48, 52) which are employed as a redundant power supply or fusible link decoupling device (50). Restraining wire (28) is wrapped around and holds together a pair of spool halves (16, 18) of a frangible actuator (12). A release pin (76) has a head portion (86), which is captured between the spool halves, and a shaft portion (86). A load, as represented by an arrow-headed line (88), exerts a force upon the release pin tending to move it away from frangible actuator (12). Current from either of the power supplies can cause a failure of its connected fuse wire which, upon failure, releases the insulator hub from being held in place. Release of the hub in turn frees restraining wire end (32) and permits the spool halves to separate under exertion of the load, as denoted by arrow-headed line (88). Should one power supply fail for any reason, current will also flow from the other power supply through its connecting wire to cause a failure of its fuse wire. Additional fuse wires (42a', 42b') may be parallelly added to fuse wires (42a, 42b) to preclude premature separation of restraining wire (28) from the hub.

19 Claims, 2 Drawing Sheets

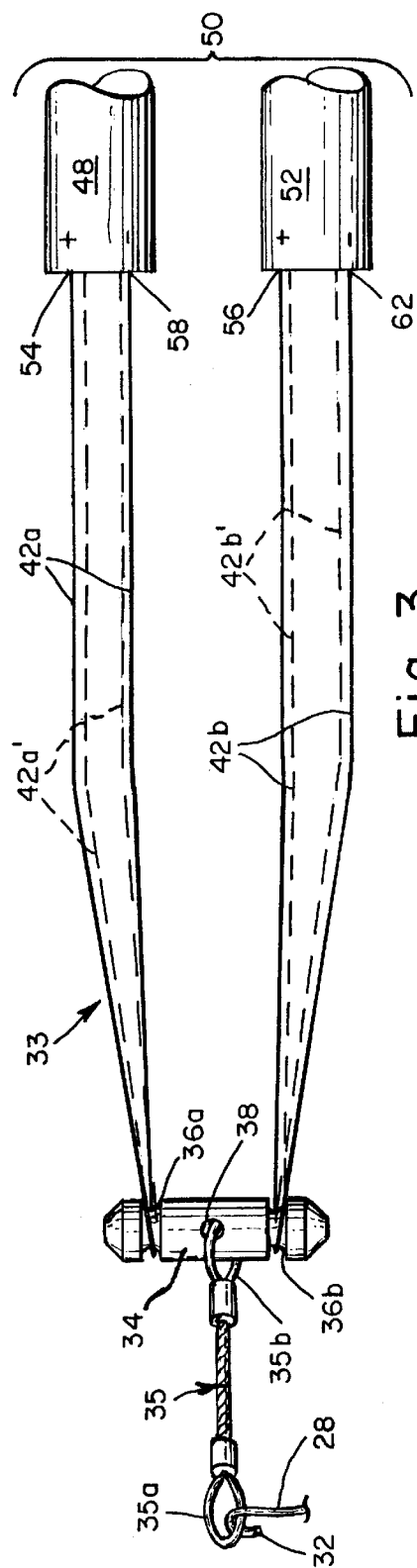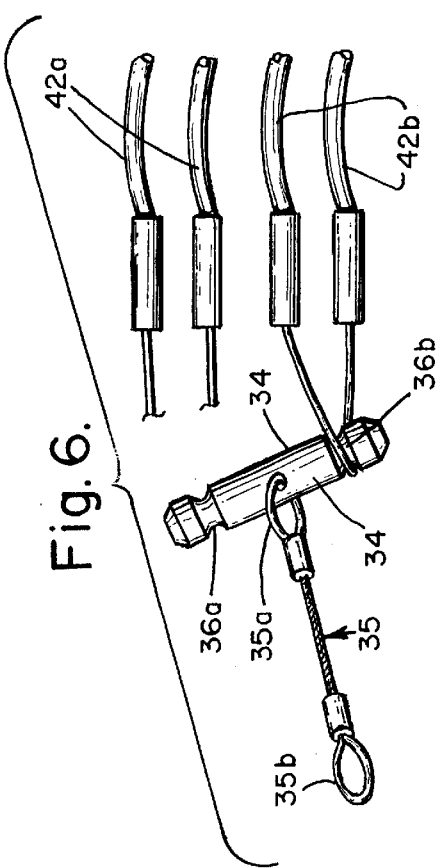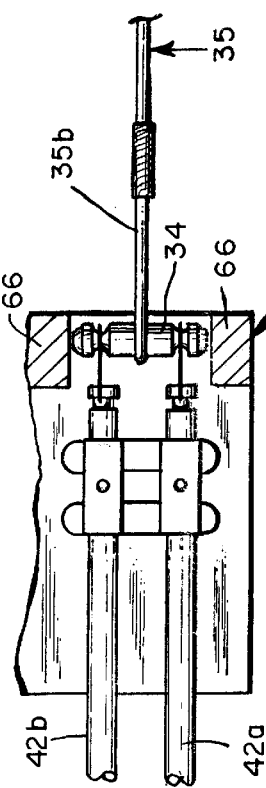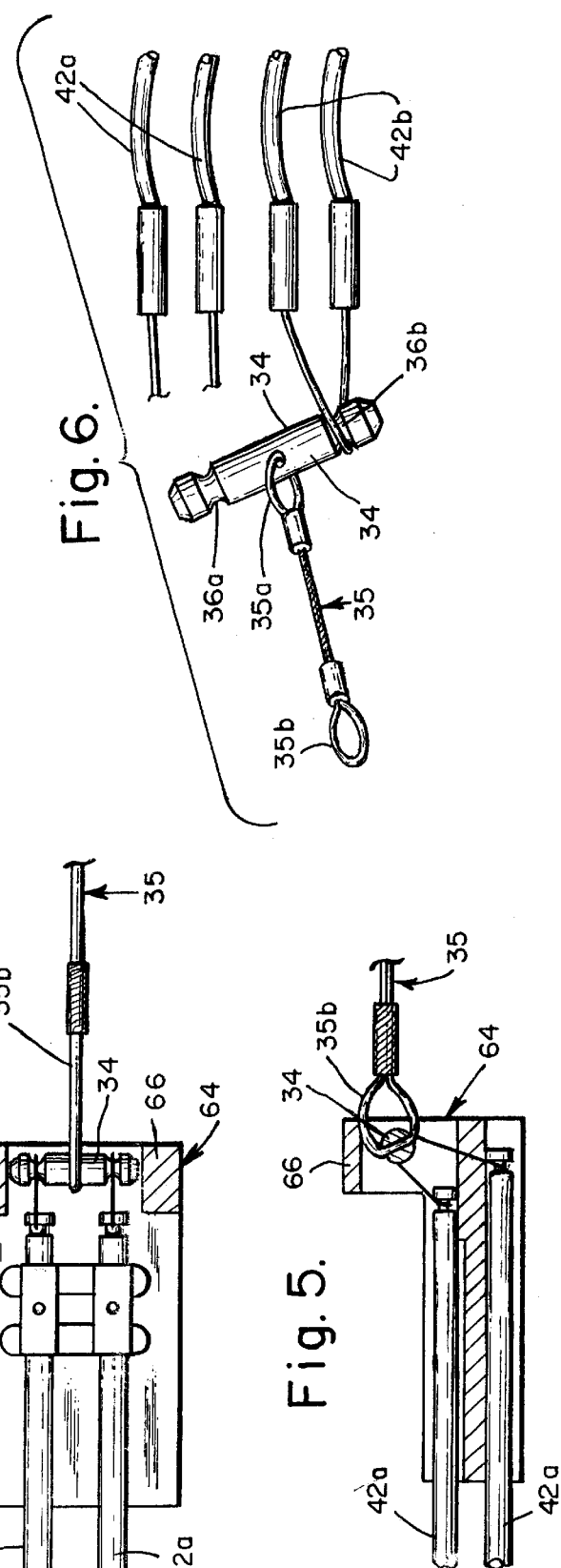

ELECTRICALLY AND MECHANICALLY REDUNDANT RELEASE MECHANISM

CROSS-REFERENCE TO RELATED APPLICATION

This application claims the benefit of U.S. Provisional Application No. 60/197,014, filed Apr. 13, 2000.

REFERENCE REGARDING FEDERAL SPONSORSHIP

Not Applicable

REFERENCE TO MICROFICHE APPENDIX

Not Applicable

TECHNICAL FIELD OF THE INVENTION

The present invention relates to an electrically and mechanically redundant release mechanism for release of an element and, more specifically, to such a release mechanism which is useful for actuating non-explosive, frangible actuator devices for quick release of loads coupled to such devices. As such, the present invention is an improvement and variation of application Ser. No. 09/498,761 filed Feb. 02, 2000 entitled "Frangible Actuator with Redundant Power Supply" and assigned to the assignee hereof. Ser. No. 09/498,761 is incorporated herein as if set forth in haec verba.

BACKGROUND OF THE INVENTION

While the present invention was devised for specific use with non-explosive, frangible actuator devices for quick release of loads coupled thereto, it is to be understood that the present invention has broader applicability and, therefore, it is not intended that it be limited thereto. However, because of this expressed use, the following exposition will be specific to such frangible actuator devices.

Accordingly, non-explosive frangible actuators are used to perform a task, often releasing a tensile load (such as a stowed solar array or antennae on a satellite) upon electronic command. Because of the damage of explosion in aerospace applications, and the weight of the satellite and other loads to be released, actuators must first restrain and then quickly release massive loads with a minimum mechanical shock imparted to the surrounding separate components or devices. Typically, such actuators utilize a multi-part spool held together by a wound restraining wire (with memory). A load is restrained by the barrier formed by the intersection of the parts of the spool (when held together by the restraining wire). A pin bears against the spool at one end of the pin and holds the load at the other end of the pin. A small frangible fuse keeps the restraining wire from unraveling until a weak electrical current causes the frangible fuse to fail in tension, to allow the restraining wire to unwind and thus to free and permit the parts of the spool to separate, eliminating the resistance to the load. Some actuators apply the full force of the load to the spool, while others utilize a series of moving parts to create a mechanical advantage, so that only a small portion of the load need be resisted by the spool. Typically, prior art devices used a single power supply.

The invention described in above-referenced patent application, Ser. No. 09/498,761, was designed to avoid problems exhibited in prior art devices.

SUMMARY OF THE INVENTION

As an improvement and variation of the invention described in above-referenced application Ser. No. 09/498,761, in its preferred embodiment, the present invention provides a redundant releasing mechanism, e.g., a fuse wire system, comprising at least two fusible links or fuse wires, which can be appropriately severed. The releasing mechanism is initiated by a power supply or fusible link/fuse wire decoupling device for the severable links. The power supply preferably is also redundant and typically includes at least two power supplies which may be individually coupled into the release mechanism fusible links as separate circuits where, should one power supply fail upon activation, the other will still initiate at least one of the fusible links. Typically, the releasing mechanism is coupled to a segmentable frangible actuator which is held together by a restraining wire wound about its segments. The restraining wire is coupled at one end to the release mechanism.

In responsive to current from the power supply, the release mechanism releases the restraining wire which, in turn, permits the segments of the frangible actuator to separate and thus release a load secured thereto.

More specifically, the release mechanism comprises two fusible links or fuse wires coupled to a load restraining agent or support which is embodied as an insulator hub. The fusible link couplings are so arranged that, upon breaking of either link, the insulator hub is freed from holding the frangible actuator as a unit and, thus, from restraining the load. Furthermore, each of the two fusible links may be paired to provide redundancy should any one of the fusible links prematurely break prior to a planned break of any fusible link and, therefore, to prevent premature decoupling of the restraining wire from the hub.

Several advantages are derived from this arrangement. The releasing actuation is rapid, and is assured by use of redundant circuitry. Additional confidence is provided by coupling the releasing mechanism to redundant power supplies to assure rupture of the fusible links, and by utilizing redundant fusible links to avoid premature releasing initiation before a desired or scheduled release.

Other aims and advantages, as well as a more complete understanding of the present invention, will appear from the following explanation of exemplary embodiments and the accompanying drawings thereof.

BRIEF DESCRIPTION OF THE DRAWINGS

FIG. 3 is a view of the preferred embodiment of the redundant release mechanism shown in FIG. 1, in its connection to the restraining wire for maintaining the spool in its segmented state. The redundant release mechanism is illustrated as comprising two primary fusible links, shown as solid lines, connected to an insulator hub. As an enhanced embodiment, each primary fusible link may be paired with a secondary fusible link, each shown in dashed line. The secondary fusible links provide precautionary redundancy, and form back up connections for the primary fusible links. The purpose is to avoid premature release of the spool restraining wire, should one of either pair of links break before the planned release occurs. The two primary and secondary fusible links are respectively electrically coupled to their source of power, which together constitute a redundant power supply or fusible link decoupling device.

FIGS. 4 and 5 respectively are top and side views of the redundant fuse wire system of the present invention.

FIG. 6 is a schematic drawing of the circuitry of the present invention, showing one fusible link of the redundant release mechanisms depicted in FIGS. 3–5 in its unrestraining condition.

DETAILED DESCRIPTION OF THE PREFERRED EMBODIMENTS

Figure 1:
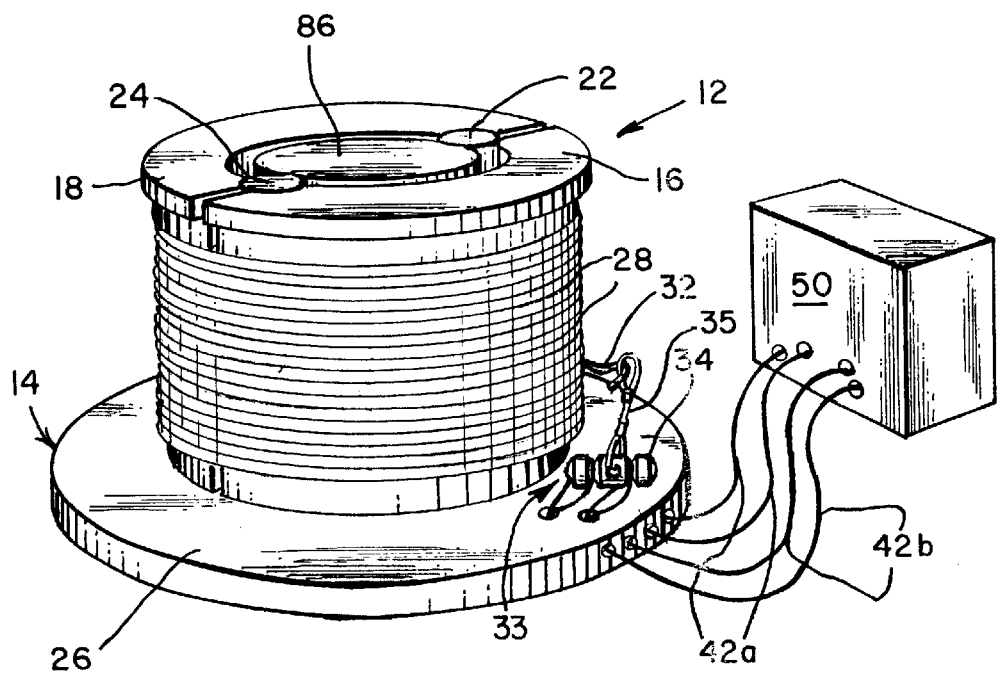
FIG. 1 is a perspective view of a segmented spool which is held unified by a restraining wire. The restraining wire is held in its spool unifying state by the present invention, exemplified as a redundant electrically and mechanically release mechanism. The redundant release mechanism is connected to a supply of power, exemplified by a pair of redundant power supplies.

As depicted in FIG. 1, a frangible actuator 12 includes a base portion 14, a first half-spool 16, a second half-spool 18, and first and second restraining pins 22 and 24. Restraining pins 22 and 24 are rigidly mounted to base portion 14, while half-spools 16 and 18 rest movably on an upper surface 26 of base portion 14. The half-spools and the base portion can be made of any number of materials; however, it has been found that, when loads are directly applied to the spool, metals such as stainless steel have a higher tensile strength and can handle greater loads. Half-spools made of 15–5 PH stainless steel have been found to be most satisfactory for many applications.

As noted above, it is desirable to make the half-spools 16 and 18 and base portion 14 non-conductive. Therefore, in a preferred embodiment, the stainless steel is coated with a layer of aluminum oxide ($Al_2O_3$) ideally 1/1000 to 3/1000 of an inch (0.0254 to 0.0762 mm). The half-spools can be made in any number of sizes, depending upon the application; however, it has been found that half-spools of diameter 0.8 inches (2.03 cm) and a height of 0.7 inches (1.778 cm) are well suited for loads of up to about 7,500 pounds (34,019 kg). Similarly, the dimensions of base portion 14 may be 2.0 inches (5.08 cm) by 1.5 inches (3.81 cm), and the restraining pins 0.125 inches (0.32 cm) in diameter and 0.7 inches (1.778 cm) in height, for use in a preferred embodiment suitable for many aerospace applications. Upper surface 26 of base portion 14 may also be coated with aluminum oxide further to prevent accidental grounding.

Frangible actuator 12 is held in a restrained position by a restraining wire 28 which has two ends, a hook-shaped release end 32 and an attachment end (not shown). Restraining wire 28 may be made of any number of materials having a memory such that, if released, it will return to its uncoiled state. Stainless steel wire has been found to be quite effective. A wire, employed as restraining wire 28, which is approximately five feet long, will wrap around a spool of the above dimensions approximately twenty times and will allow loads up to about 7,500 pounds (34,019 kg) with a minimum actuation current of about 2.0 amperes and, ideally, about 4.5 amperes. It has been found that the optimal relationship between the wire and the spool (formed of two half-spools 16 and 18) can be calculated from the following formula:

$$S=0.8(W/0.026)2$$

where:

S=Spool Diameter, and

W=Wire Diameter and the figure 0.026 may be anywhere in the range of 0.021 to 0.031.

The attachment end is permanently mounted to one of the two half-spools. Mounting can be accomplished in any number of ways, such as by welding, bolting, and other means customary in the trade. Release end 32 forms an open hook which is securable to a releasing mechanism 33. Mechanism 33 includes an insulator hub or support 34 which is coupled to hook-shaped release end 32 through the intermediary of a lanyard 35 (see also FIG. 3).

As best shown in FIG. 3, insulator hub 34 of releasing mechanism 33 is provided with a pair of parallel annular grooves or fusible link coupling points 36a and 36b which are generally spaced equally from a central hole 38, sometimes referred to herein as a restraining wire coupling point. The insulator hub may be made of any number of non-conductive materials, such as polyamide imid (also known as TORLON® made by Amoco Chemical). A pair of fuse wires or fusible links 42a and 42b respectively pass around and reside within grooves 36a and 36b of the insulator hub or support. Lanyard 35 is terminated by closed loop ends 35a and 35b. Loop end 35b passes through central hole 38 of hub 34 and is thereby secured thereto. Loop 35a is disposed to releasably receive hook-shaped release end 32 of restraining wire 28.

As shown in FIGS. 4 and 5, hub or support 34 is propped within a brace 64 between a pair of brace sides 66. Sides 66 serve as an aid for maintaining the hub in a disposition vis-a-vis the fusible links and the restraining wire via lanyard 35 from forces which might otherwise prematurely decouple this restraining wire element from the hub.

A power supply or fusible link decoupling device 50 is provided for disjoining fuse wires or fusible links 42a and 42b and comprises at least two redundant power supplies, a primary power supply 48 and a secondary power supply 52. Three or more power supplies may be employed for added security; however, for many applications two have been found to be adequate. In a preferred embodiment, both power supplies are direct current, with an output of about 4.5 amperes suitable for most applications. Each power supply has a positive and a negative terminal, such that primary power supply 48 has positive terminal 54 and negative terminal 58, and secondary power supply 52 has positive terminal 56 and negative terminal 62. Positive and negative terminals 54 and 58 are connected to the respective ends of fuse wire 42a. Similarly, positive and negative terminals 56 and 62 are connected to the respective ends of fuse wire 42b. These individual power supply to fuse wire connections isolate the two circuits from one another.

As an alternate to the embodiment illustrated in FIG. 3, prevention of premature initiation of the release mechanism prior to a planned or scheduled event is effected by adding fuse wires 42a' and 42b' which are placed in parallel with fuse wires 42a and 42b, and looped around grooves 36a and 36b. Should one of the fuse wires break for any reason prior to when it is wished or scheduled, the parallel wire will retain the integrity of the release mechanism, thereby preventing premature release.

Regardless of which primary or secondary power supply 48 or 52 is activated, currents will be generated which will pass through fuse wires 42a and 42b, causing the respective fuse wire to fail in tension.

Figure 2:
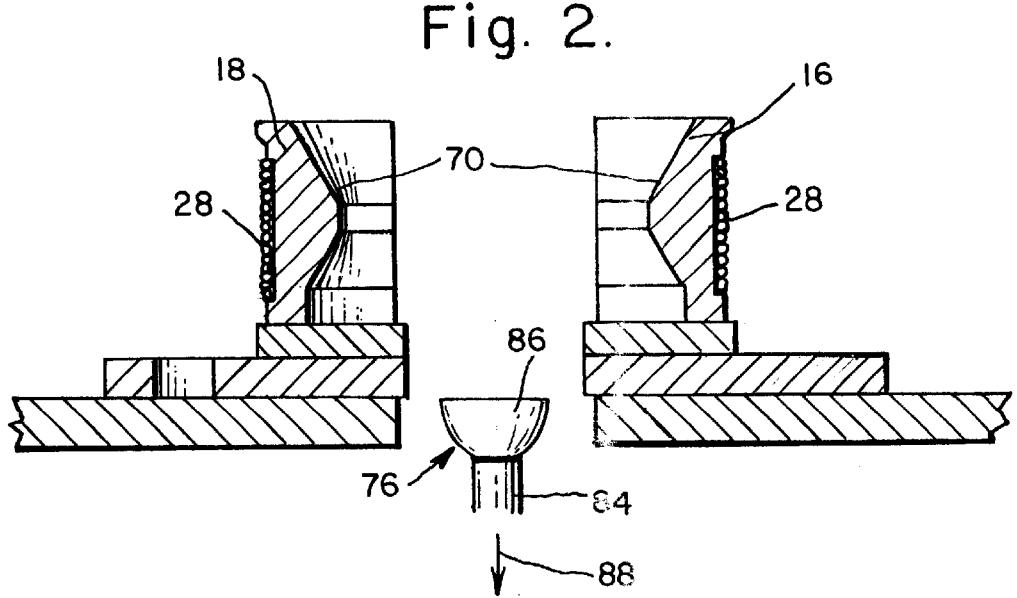
FIG. 2 is a cross sectional view of the FIG. 1 segmented spool, after being separated in a released state.

As discussed above with respect to FIGS. 1 and 2, frangible actuator 12 comprises two halfspools, first half-spool 16 and second half-spool 18. Three third-spools, four fourth spools, or other combinations can be employed depending upon the application. The herein described half-spool embodiment has been found to work well in many aerospace applications. Details of the mechanisms enabling separation of half-spools 16 and 18 are fully described in above referenced co-pending application, Ser. No. 498,761. Briefly, separation of the spool-halves is enabled, in part, by passage of a head 86 against the interior surfaces 70 of the respective half-spools. Head 86 is positioned at the end of a shaft section 84 of a release pin 76. Shaft section 84 is subjected to a load, as denoted by arrow-headed line 88, and its movement is in the direction of the arrow head. Movement of release pin 76 is prevented when head portion 86 is captured within spool-halves 16 and 18 by interior surfaces 70.

In operation, frangible actuator 12 is placed and held together as a unit by bringing first and second half-spools 16 and 18 together atop upper surface 26, and fitting restraining pins 22 and 24 within the mating cavities of the half-spools. Restraining wire 28 is wrapped around the mated spool halves. Hook-shaped release end 32 of restraining wire 28 is inserted through closed loop 35*a* of lanyard 35.

Restraining wire 28 is thus held in place around the spool halves through the intermediary of releasing mechanism 33, and when fuse wires 42*a* and 42*b* pass around grooves or fusible link coupling points 36*a* and 36*b* of insulator hub or support 34. When the spool halves are so restrained, shaft section 84 of release pin 76 is captured or otherwise held within the spool halves, and movement of release pin 76 is accordingly restrained by head portion 86 bearing against interior surface 70. A load (as denoted by arrow-headed line 88) is then attached to the end of release pin 76 at a point distant from restraining head portion 86.

Initiation of release by mechanism 33 may be effected automatically, by time, location, or any other variable. Initiation may also be produced manually, provided by a switch for use by an astronaut, pilot, or ground technician. Upon initiation, primary power supply 48 and secondary power supply 52 are both activated. Current from primary power supply 48 flows through fuse wire 42*a*. The current in that completed circuit is adequate to cause a failure in tension in fuse wire 42*a*, which permits hub 34 to pivot, as shown in FIG. 6. Hook-shaped release end 32 is thus enabled to slip or otherwise to separate from closed loop 35*b* of lanyard 35, to permit release of restraining wire 28. Restraining wire 28, which accordingly unravels, thus no longer maintains the unity of first and second half-spools 16 and 18. Prior to release of restraining wire 28, movement of release pin 76 under the coercion of the load (arrow-headed line 88) had been resisted by the restraint of head portion 86 bearing against interior surface 70 of first and second half-spools 16 and 18. When restraining wire 28 unravels, the half-spools are free to move apart and, in fact, are forced apart by head portion 86, to allow release pin 76 to move thorough frangible actuator 12 under force of the load. Should primary power supply 48 fail for any reason, current will flow from secondary power supply 52 (which, as stated above, is activated simultaneously with primary power supply 48) completing the circuit and causing fuse wire 42*b* to fail in tension.

The present invention also utilizes insulator hub 34 to isolate frangible actuator 12 which, because of its size and its permanent attachment to hook-shaped release end 32 of restraining wire 28 through the intermediary of lanyard 35, simply travels with unwinding restraining wire 28.

The present invention can be front or rear loaded, that is, the load can push against the spool-separating release pin from its top, or can exert a pull on the release pin from its bottom.

Although the invention has been described with respect to particular embodiments thereof, it should be realized that various changes and modifications may be made therein without departing from the spirit and scope of the invention.

What is claimed is:

1. A redundant release mechanism for releasing an element, comprising:
   a support having spaced fusible link coupling points and an element coupling point positioned therebetween;
   a coupling coupling the element to said support;
   fusible links respectively coupled to said fusible link coupling points and having an orientation vis-a-vis said element for maintaining the coupling thereof to said support; and
   a fusible link decoupling device coupled to said fusible links and operable to enable decoupling of at least one of said fusible links for enabling decoupling of said element from said support.

2. A redundant release mechanism according to claim 1 further including additional fusible links respectively paired with said first-mentioned fusible links to provide redundancy should any one of said paired fusible links break when not planned and, therefore, to prevent premature decoupling of said element from said support.

3. A redundant release mechanism according to claim 1 further including a brace for maintaining said support in a disposition vis-a-vis said fusible links and said element from forces which might otherwise prematurely decouple said element from said support.

4. A redundant release mechanism according to claim 1 wherein said fusible link decoupling device comprises a pair of independent fusible link decoupling devices which are independently coupled to said fusible links for providing a redundant enabling of the decoupling.

5. A redundant release mechanism for releasing an element, comprising:
   a hub having a pair of spaced annular grooves and an opening positioned between said grooves;
   a lanyard having a first end coupled to said hub at said central opening and a second end coupled to said element, said lanyard extending in a first direction;
   fuse wires respectively looped around said spaced annular grooves and extending in a direction generally opposite from that of said lanyard to maintain the coupling between said lanyard second end and said element; and
   a power supply electrically coupled to said fuse wires and operable to enable rupture at least one of said wires for enabling decoupling of said element from said lanyard second end.

6. A redundant release mechanism according to claim 5 in which said hub is formed of a dielectric material to insulate said fuse wires from one another.

7. A redundant release mechanism according to claim 5 further including additional fuse wires respectively paired with said first-mentioned fuse wires to provide redundancy should any one of said paired fuse wires break and, therefore, to prevent premature decoupling of said element from said lanyard second end.

8. A redundant release mechanism according to claim 5 further including a brace for maintaining said hub in a disposition vis-a-vis said fuse wires and said element from forces which might otherwise prematurely decouple said element from said lanyard second end.

9. A redundant release mechanism according to claim 5 wherein said power supply comprises a pair of independent power supplies which are independently coupled to said fuse wires for providing a redundant enabling of the decoupling.

10. A redundant release mechanism according to claim 9 further including additional fuse wires respectively paired with said first-mentioned fuse wires to provide redundancy should any one of said paired fuse wires break and, therefore, to prevent premature decoupling of said element from said lanyard second end.

11. A redundant release mechanism according to claim 9 further including a brace for maintaining said hub in a disposition vis-a-vis said fuse wires and said element from forces which might otherwise prematurely decouple said element from said lanyard second end.

12. A frangible actuator comprising:

a release pin and a plurality of restraining parts, said restraining parts having a blocking position defined by their being positioned adjacently to one other and having an open position defined by their being positioned distantly from one other, and a restraining wire being disposed to be wound around and to hold said restraining parts together when in the blocked position and being disposed to being unwound to release said restraining parts and to move said restraining parts into the open position; and a redundant release mechanism for releasing said restraining wire, in which said release mechanism includes a hub having a pair of spaced annular grooves and an opening spaced between said grooves;

a lanyard having a first end coupled to said hub at said central opening and a second end coupled to said restraining wire, said lanyard extending in a first direction;

fuse wires respectively looped around said spaced annular grooves and extending in a direction generally opposite from that of said lanyard to maintain the coupling between said lanyard second end and said restraining wire and to maintain the winding of said restraining wire about said restraining parts; and a power supply electrically coupled to said fuse wires and operable to enable rupture at least one of said wires for enabling decoupling of said restraining wire from said lanyard second end and unwinding of said restraining wire from said restraining parts.

13. A frangible actuator according to claim 12 further including additional fuse wires respectively paired with said first-mentioned fuse wires to provide redundancy should any one of said paired fuse wires break and, therefore, to prevent premature decoupling of said restraining wire from said lanyard second end.

14. A frangible actuator according to claim 13 further including a brace for maintaining said hub in a disposition vis-a-vis said fuse wires and said restraining wire from forces which might otherwise prematurely decouple said restraining wire from said lanyard second end.

15. A frangible actuator according to claim 14 wherein said power supply comprises a pair of independent power supplies which are independently coupled to said fuse wires for providing a redundant enabling of the decoupling.

16. A method for enabling redundant release of an element, comprising the steps of:

providing a pair of spaced fusible link coupling points and an element coupling point placed therebetween on a support;

coupling the element to the coupling point;

coupling fusible links respectively to the spaced fusible link coupling points in an arrangement for enabling maintenance of the couplings of the element and the fusible links to the support; and coupling the fusible links to a fusible link decoupling device which is operable to enable decoupling of at least one of the fusible links and, thereby, for enabling decoupling of the element from the support.

17. A method according to claim 15 further including the step of adding fusible links in pairs with the first-mentioned fusible links to provide redundancy should any one of fusible links prematurely break prior to a planned break of the fusible links and, therefore, to prevent premature decoupling of the element from the support.

18. A method according to claim 17 further including the step of bracing and thereby maintaining the support in a disposition vis-a-vis the fusible links and the element from forces which might otherwise prematurely decouple the element from the support.

19. A method according to claim 16 comprising the step of providing at least one additional fusible link decoupling device which is independently coupled to the fusible links for providing a redundant enabling of the decoupling.

* * * * *

UNITED STATES PATENT AND TRADEMARK OFFICE
CERTIFICATE OF CORRECTION

| | | |
|---|---|---|
| PATENT NO. | : 6,525,920 B2 | Page 1 of 1 |
| APPLICATION NO. | : 09/835090 | |
| DATED | : February 25, 2003 | |
| INVENTOR(S) | : Edward Rudoy et al. | |

It is certified that error appears in the above-identified patent and that said Letters Patent is hereby corrected as shown below:

Col. 8 line 25, Claim 17: Delete "15" and insert therefor --16--

Signed and Sealed this

Twenty-fifth Day of May, 2010

David J. Kappos
*Director of the United States Patent and Trademark Office*